(12) United States Patent
Roy

(10) Patent No.: US 8,908,986 B1
(45) Date of Patent: Dec. 9, 2014

(54) SYSTEMS AND METHODS FOR SELECTING INK COLORS

(71) Applicant: Teespring, Inc., Providence, RI (US)

(72) Inventor: Nicolas Roy, Gatineau (CA)

(73) Assignee: Teespring, Inc., Providence, RI (US)

( * ) Notice: Subject to any disclaimer, the term of this patent is extended or adjusted under 35 U.S.C. 154(b) by 0 days.

(21) Appl. No.: 14/338,459

(22) Filed: Jul. 23, 2014

(51) Int. Cl.
*G06K 9/00* (2006.01)
*G06K 9/36* (2006.01)
*G06K 9/46* (2006.01)
*B41F 33/00* (2006.01)
*B41M 1/12* (2006.01)
*B41M 1/14* (2006.01)
*B41F 33/16* (2006.01)
*G06T 7/00* (2006.01)

(52) U.S. Cl.
CPC .............. *B41F 33/0027* (2013.01); *B41M 1/12* (2013.01); *B41M 1/14* (2013.01); *B41F 33/16* (2013.01); *G06T 7/0081* (2013.01); *G06K 9/4652* (2013.01)
USPC .......................................... 382/251; 382/166

(58) Field of Classification Search
CPC ..................................................... H04N 1/644
USPC ................... 382/162, 164, 166, 251; 345/593
See application file for complete search history.

(56) References Cited

U.S. PATENT DOCUMENTS

| | | | |
|---|---|---|---|
| 5,585,944 A | 12/1996 | Rodriguez | |
| 6,324,441 B1 * | 11/2001 | Yamada | ........................ 700/138 |
| 6,343,851 B2 | 2/2002 | Moskalev | |
| 6,970,176 B1 * | 11/2005 | Van Der Meulen et al. | .. 345/593 |
| 7,031,510 B2 | 4/2006 | Imamura et al. | |
| 7,545,976 B2 | 6/2009 | Gondek et al. | |
| 8,711,452 B2 | 4/2014 | Hamilton, Jr. et al. | |
| 2010/0214336 A1 * | 8/2010 | Kuno | ............................... 347/12 |
| 2011/0292451 A1 | 12/2011 | Harvill | |
| 2014/0029842 A1 * | 1/2014 | Bao et al. | ....................... 382/164 |
| 2014/0044349 A1 | 2/2014 | Wang et al. | |
| 2014/0064612 A1 * | 3/2014 | Matsumura et al. | .......... 382/166 |

FOREIGN PATENT DOCUMENTS

| | | |
|---|---|---|
| EP | 1289271 A2 | 3/2003 |
| JP | 2005328845 A | 12/2005 |
| WO | WO-2011089094 A1 | 7/2011 |

OTHER PUBLICATIONS

Orchard et al. ("Color Quantization of Images," IEEE Transactions on Signal Processing, vol. 19, No. 12, Dec. 1991, pp. 2677-2690).*
"Content Based Image Retrieval Using Dominant Color Identification Based on Foreground Objects," downloaded on Jul. 22, 2014 from http://ieeexplore.ieee.org/xpl/login.jsp?tp=&arnumber=4426366&url=http%3A%2F%2Fieeexplore.ieee.org%2Fxpls%2Fabs_all.jsp%3Farnumber%3D4426366, 2 pages, (2007) Abstract Only.

(Continued)

*Primary Examiner* — Yubin Hung
(74) *Attorney, Agent, or Firm* — Goodwin Procter LLP

(57) ABSTRACT

Implementations of the present disclosure are directed to a method, system, and computer-readable medium for choosing ink colors for a screen printing process. An image to be reproduced with the screen printing process is obtained, and sample pixels within the image are selected. For each sample pixel, if the color of the sample pixel is not similar to an already chosen ink color, neighboring pixels around the sample pixel are identified. When the colors of the sample pixel and its neighboring pixels are similar, an ink color is chosen to be a representative color of the sample pixel and its neighboring pixels.

19 Claims, 7 Drawing Sheets

(56) References Cited

OTHER PUBLICATIONS

"Development of Color Management System Prototype," downloaded on Jul. 22, 2014 from http://ieeexplore.ieee.org/xpl/articleDetails.jsp?tp=&arnumber=725038&queryText%3Dscreen+printing+and+colour, 2 pages. (1998) Abstract Only.

* cited by examiner

SYSTEMS AND METHODS FOR SELECTING INK COLORS

BACKGROUND

The present disclosure relates to screen printing and, in particular, to determining ink colors to be used in a screen printing process.

Screen printing is a printing process that utilizes a stencil supported by a mesh to reproduce an image on various substrates, such as t-shirts, posters, or other materials. The stencil includes openings that define the image and permit ink to flow through the mesh and onto the substrate. A squeegee or other blade device is used to push the ink through the mesh and onto the substrate.

Before printing the image, an algorithm is used to analyze the image and identify an appropriate combination of ink colors (e.g., up to 10 ink colors total) that can be used to print the image. Existing algorithms use histograms that consider the color of each pixel in the digital image. These histogram approaches are generally computationally intensive and slow, particularly given the large number of pixels that the digital image may contain. The histogram approaches also give insufficient consideration to the locations of the pixels in the image and to the colors of neighboring pixels. As a result, compression effects (e.g., due to file size reduction in JPEG images) and other artifacts (e.g., anti-aliasing in raster images) are not considered properly and can distort the ink color selection process. For example, a histogram approach may conclude that a separate gray ink color should be used to represent gray pixels that appear along black diagonal lines in an image, for anti-aliasing purposes (e.g., to make the edges of the lines look smoother on a computer monitor).

There is a need for improved systems and methods for identifying ink colors to be used in screen printing processes.

SUMMARY

Embodiments of the systems and methods described herein are used to choose ink colors for a screen printing process. Compared to prior ink color selection approaches, the systems and methods described herein provide several advantages. For example, the systems and methods are generally more computationally efficient. Unlike previous algorithms, which utilize histograms for each pixel in an image, embodiments of the systems and methods described herein utilize sample pixels, which form a subset of the pixels in the image. The sample pixel approach dramatically reduces the number of pixels that must be considered and the number of computations that must be performed. Computation times may be reduced from a few minutes to just a few seconds. In some instances, computation times are reduced by about a factor of 10 or about a factor of 100.

The systems and methods are also more accurate than previous algorithms, which generally give insufficient consideration to the locations of pixels in an image and to the colors of neighboring pixels. For example, compression effects in JPEG images may result in color variation that can cause previous algorithms to choose ink colors improperly. Similarly, anti-aliasing along diagonal edges or lines in an image may introduce pixels of different colors to make the edges or lines appear smoother. Previous algorithms may choose colors based on these introduced pixels. The systems and methods described herein, however, consider the colors of neighboring pixels and are able to filter out compression and anti-aliasing effects. For example, when color variation in a group of adjacent pixels is excessive, the systems and methods may search for substitute pixels or groups of pixels in locations where the compression and anti-aliasing effects are insignificant. Alternatively or additionally, the systems and methods may simply ignore sample pixels where color variation is excessive and may move on to consider a next sample pixel in the set.

In one aspect, the invention relates to a method of identifying ink colors for a screen printing process. The method includes: obtaining an image (e.g., a digital image having pixels) to be reproduced with the screen printing process; selecting a set of sample pixels within the image; and, for each sample pixel in the set: (a) determining a color of the sample pixel; (b) if the color of the sample pixel is similar to an already chosen ink color, proceeding to a next sample pixel in the set and returning to step (a); (c) identifying colors of neighboring pixels around the sample pixel, the sample pixel and the neighboring pixels defining a first group of pixels; (d) if the colors of the first group of pixels are similar, choosing an ink color to be a representative color of the first group of pixels; and (e) proceeding to a next sample pixel in the set and returning to step (a).

In certain examples, the sample pixels are arranged in a grid within the image and define a subset of pixels within the image. The color of the sample pixel may be similar to the already chosen ink color when the color of the sample pixel and the already chosen ink color are within a threshold distance (e.g., a Euclidean distance or a CIEDE2000 distance) in a color space (e.g., CIELAB, CIERGB, CIELUV, CIEUVW, or CIELCH). The first group of pixels may define a diamond-shaped pattern around the sample pixel (e.g., with about 5, about 9, about 13, or about 25 total pixels in the first group). In some instances, the colors of the first group of pixels are similar when the colors of the first group of pixels are within a threshold distance of one another in a color space. The representative color of the first group of pixels may be the color of the sample pixel or the color of another pixel or pixels in the first group. In some examples, choosing an ink color to be the representative color of the first group of pixels includes using quantization (e.g., modified median cut quantization algorithm or octree).

In various implementations, if the colors of the first group of pixels are not similar, the method includes: selecting a substitute sample pixel in a vicinity of the sample pixel; determining a color of the substitute pixel; identifying colors of neighboring pixels around the substitute pixel, the substitute pixel and the neighboring pixels around the substitute pixel defining a second group of pixels (e.g., about 5, about 9, about 13, or about 25 total pixels); and, if the colors of the second group of pixels are similar, choosing an ink color to be a representative color of the second group of pixels. The vicinity of the sample pixel is preferably outside of the first group of pixels. The second group of pixels may define a diamond-shaped pattern. In one example, the colors of the second group of pixels are similar when the colors of the second group of pixels are within a threshold distance of one another in a color space.

In some examples, choosing the ink color to be the representative color of the second group of pixels includes using quantization (e.g., modified median cut quantization algorithm or octree). The method may also include selecting a new substitute pixel in the vicinity of the sample pixel when the color of the substitute pixel and an already chosen ink color are within a threshold distance in a color space. The method may also include selecting a new substitute pixel in the vicinity of the sample pixel when the colors in the second group of pixels are not similar. In some instances, the method includes identifying a group of chosen ink colors that fall within a threshold distance in color space, and choosing a representative ink color for the group of chosen ink colors.

In another aspect, the invention relates to a system that includes (i) a computer readable medium having instructions stored thereon, and (ii) a data processing apparatus. The data processing apparatus is configured to execute the instructions to perform operations that include: obtaining an image to be reproduced with the screen printing process; selecting a set of sample pixels within the image; and, for each sample pixel in the set: (a) determining a color of the sample pixel; (b) if the color of the sample pixel is similar to an already chosen ink color, proceeding to a next sample pixel in the set and returning to step (a); (c) identifying colors of neighboring pixels around the sample pixel, the sample pixel and the neighboring pixels defining a first group of pixels; (d) if the colors of the first group of pixels are similar, choosing an ink color to be a representative color of the first group of pixels; and (e) proceeding to a next sample pixel in the set and returning to step (a).

In another aspect, the invention relates to a computer program product stored in one or more storage media for controlling a processing mode of a data processing apparatus. The computer program product is executable by the data processing apparatus to cause the data processing apparatus to perform operations that include: obtaining an image to be reproduced with the screen printing process; selecting a set of sample pixels within the image; and, for each sample pixel in the set: (a) determining a color of the sample pixel; (b) if the color of the sample pixel is similar to an already chosen ink color, proceeding to a next sample pixel in the set and returning to step (a); (c) identifying colors of neighboring pixels around the sample pixel, the sample pixel and the neighboring pixels defining a first group of pixels; (d) if the colors of the first group of pixels are similar, choosing an ink color to be a representative color of the first group of pixels; and (e) proceeding to a next sample pixel in the set and returning to step (a).

Elements of embodiments described with respect to a given aspect of the invention may be used in various embodiments of another aspect of the invention. For example, it is contemplated that features of dependent claims depending from one independent claim can be used in apparatus and/or methods of any of the other independent claims

DETAILED DESCRIPTION

Figure 1:
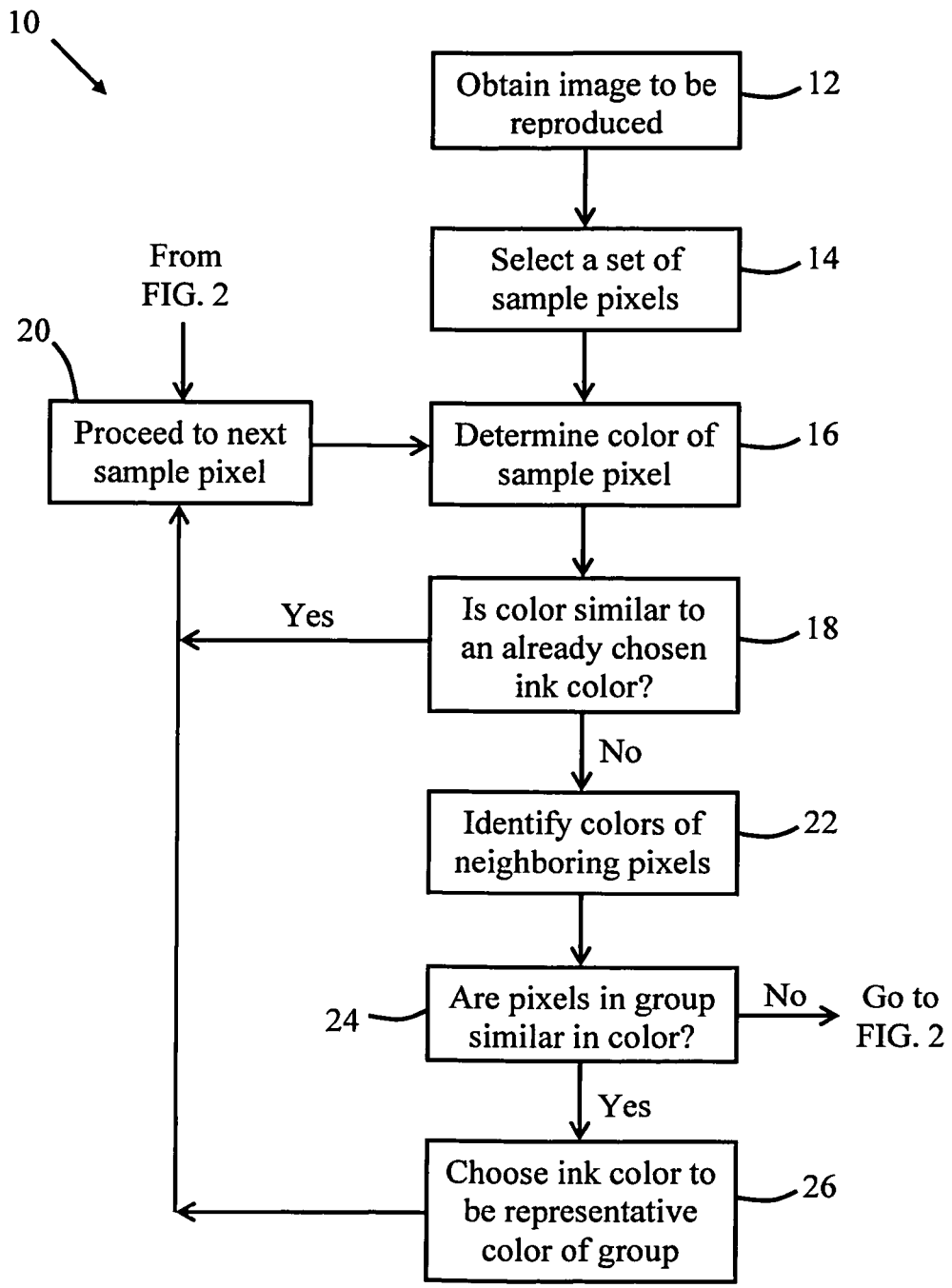
FIG. 1 is a flowchart of an example method of selecting ink colors for a screen printing process.

FIG. 1 is a flowchart of an example method 10 for choosing ink colors for a screen printing process, in accordance with certain embodiments. The method 10 begins by obtaining (step 12) an image to be reproduced with the screen printing process. The image is typically a digital image (e.g., in JPEG, BMP, RAW, or PNG format) provided by a customer of an entity that operates a screen printing system. Other image formats are possible. A set of sample pixels is selected (step 14) within the image. The sample pixels are preferably not adjacent to one another and may be arranged or distributed throughout the image in a grid. Alternatively, the sample pixels may be concentrated in particular locations in the image, such as regions with many colors or with high color variation. The sample pixels generally represent locations in the image where colors may be sampled or determined.

With the sample pixels selected, a color of one of the sample pixels is determined (step 16). The color of the sample pixel is then compared (step 18) to any ink colors that have already been chosen for use in printing the image. If the color of the sample pixel is similar to an already chosen ink color (e.g., if the colors are within a threshold distance of one another in a color space), the method proceeds (step 20) to a next sample pixel in the set of sample pixels and returns to step 16. Otherwise, neighboring pixels around the sample pixel are selected. The neighboring pixels preferably include pixels that surround the sample pixel and/or are adjacent to the sample pixel, as described further herein (e.g., with respect to FIG. 3). Collectively, the sample pixel and its neighboring pixels define a first group of pixels.

Next, the colors of the neighboring pixels are identified (step 22) and a similarity of the colors in the first group of pixels is assessed (step 24). If the colors of the first group of pixels are similar, an ink color is chosen (step 26) to be a representative color of the first group of pixels. For example, the ink color may be chosen to be the color of the sample pixel or a most prevalent color within the first group of pixels. The method then proceeds (step 20) to a next sample pixel in the set and returns to step 16.

In certain embodiments, the representative color of the first group of pixels is chosen using a process of quantization, which generally provides more weight to colors that are similar and eliminates other colors that appeared due to artifacts (e.g., compression effects or anti-aliasing). A preferred quantization process utilizes a modified median cut quantization algorithm, which groups similar colors and averages the colors within each group. Other quantization algorithms may be used, however, such as octree color quantization.

Figure 2:
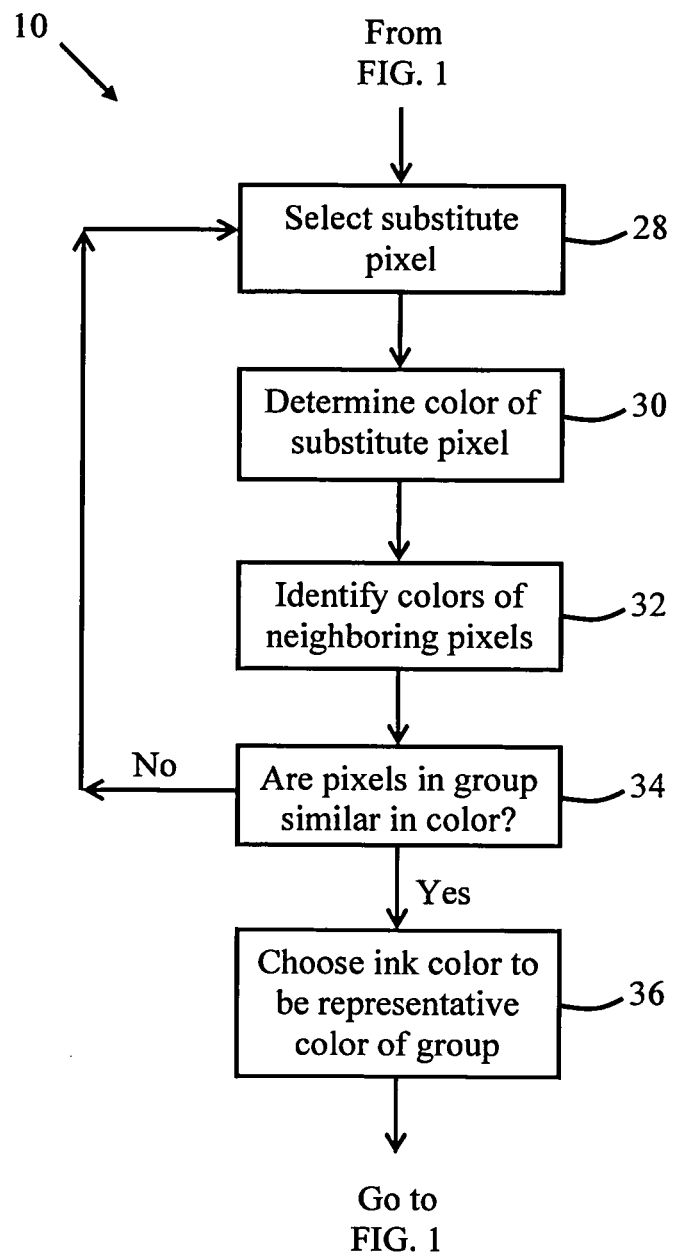
FIG. 2 is a flowchart of a portion of an example method of selecting ink colors for a screen printing process.

Referring to FIG. 2, in some instances, e.g., due to compression effects, anti-aliasing, or color variation within the image, the colors within the first group of pixels are not similar. In such a case, the method 10 avoids choosing an ink color based on the first group of pixels and instead selects (step 28) a substitute sample pixel in the vicinity of the sample pixel. For example, the substitute pixel may be between the sample pixel and another nearby sample pixel, as described further herein (e.g., with respect to FIG. 4). With the substitute pixel selected, a color of the substitute pixel is determined (step 30) and compared to any already chosen ink colors. If the color of the substitute pixel is similar to an already chosen ink color, a different substitute pixel in the vicinity of the sample pixel may be selected. Otherwise, neighboring pixels around the substitute pixel are selected. The neighboring pixels around the substitute pixel preferably include pixels that surround the substitute pixel and/or are adjacent to the substitute pixel, as described further herein (e.g., with respect to FIG. 3). Collectively, the substitute pixel and its neighboring pixels define a second group of pixels.

Next, the colors of the neighboring pixels are identified (step 32) and the similarity of the colors in the second group of pixels is assessed (step 34). If the colors of the second group of pixels are similar, an ink color is chosen (step 36) to be a representative color of the second group of pixels (e.g., the color of the substitute pixel or an average or most representative color of the second group of pixels). Otherwise, a different substitute pixel in the vicinity of the sample pixel may be identified, and steps 30 through 34 may be repeated. After an ink color has been chosen based on the second group of pixels, or if no ink color was chosen based on the second group of pixels, the method proceeds to the next sample pixel in the set and returns to step 16.

In certain implementations, the sample pixels and their neighboring pixels (i.e., the first groups of pixels) may occupy or define between about 0.01% and about 50% of the image, with the larger percentages in this range typically being used for small images. For computational efficiency and speed, the number of sample pixels may be configured to be about 15,000. This number may be increased to improve accuracy, particularly as computing equipment and software (e.g., browsers) become more efficient. The number of pixels in the first groups of pixels in the image may be, for example, from about 15,000 to about 195,000. The substitute pixels and their neighboring pixels (i.e., the second groups of pixels), if any, may occupy or define additional pixels in the image. For example, on a 1200×1600 pixel image, from about 0.8% to about 10% of the image may be occupied or defined by the first groups of pixels and the second groups of pixels.

In various implementations, the similarity between two colors or among a group of colors is determined by considering the locations of the colors in a color space, such as CIELAB, CIERGB, CIELUV, CIEUVW, and/or CIELCH. For example, two colors may be considered similar when a distance (e.g., a Euclidian distance, a CIEDE2000 distance, a CIE76 distance, and/or a CIE94 distance) between the colors in the color space (e.g., CIELAB) is less than a specified threshold value. Likewise, the colors of multiple pixels in a group may be considered similar when a median distance between all possible pairs of colors in the group is less than a threshold value. For example, if the median distance for a group of pixels in CIELAB space is greater than about 3, about 6, about 9, or about 12, the colors in the group may be considered to be not similar enough. A preferred threshold for the median distance may be, for example, about 9. Use of a threshold value for the median distance of a group of colors may permit a limited amount of artifact and anti-aliased pixels to be present within the group. For CIELAB color space, a distance (e.g., a CIEDE2000 distance) below 2.3 may be considered to be unnoticeable by the human eye. For CIELCH color space, distances or differences between colors may be computed as CMC 1:c distances.

In certain implementations, different threshold values for color difference or distance may be used, depending on the colors being compared. For example, a first threshold value may be used to determine if a sample pixel color or a substitute pixel color is similar to an already chosen ink color. A second threshold value may be used to determine if the colors of the first group or the second group are similar.

Figure 3:
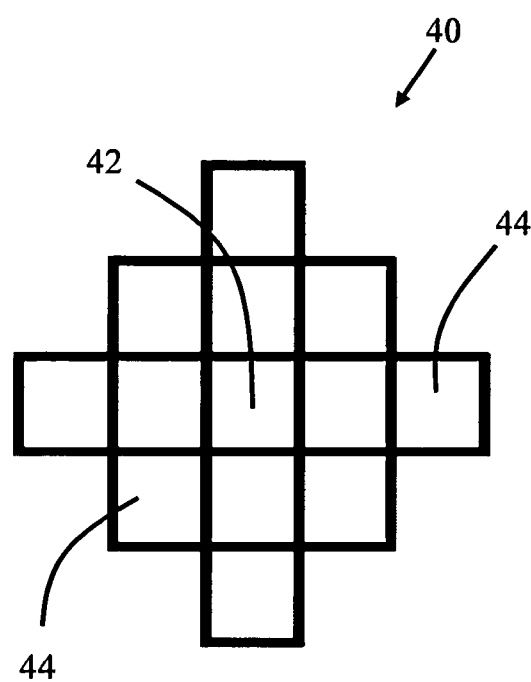
FIG. 3 is a schematic diagram of an example group of pixels.

FIG. 3 shows an example first group of pixels 40 in which a sample pixel 42 is surrounded by neighboring pixels 44. In the depicted embodiment, the first group of pixels 40 includes 13 pixels total and is arranged in a diamond shape. In general, however, the first group of pixels 40 may include any number of pixels (e.g., 5, 9, or 25) and may have a shape other than diamond, such as square or rectangular. In certain instances, the diamond shape yields good results because that shape tends to more accurately capture or detect the effects of anti-aliasing that occur along diagonal lines or edges in many digital images. The shape and/or size of the second group of pixels (i.e., containing a substitute pixel and its neighboring pixels) may or may not be the same as the shape and/or size of the first group of pixels.

Figure 4:
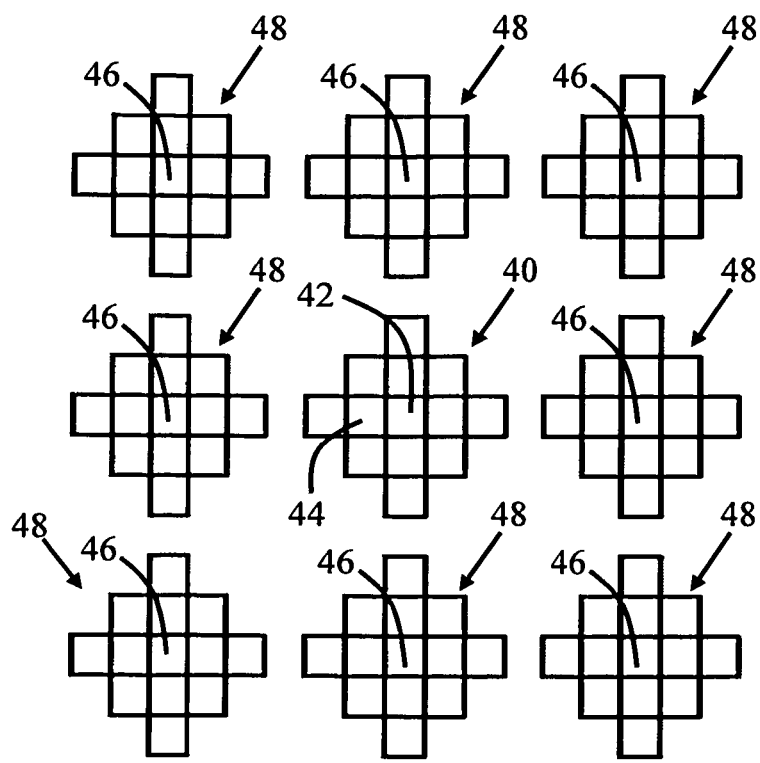
FIG. 4 is a schematic diagram of example groups of pixels.

Referring to FIG. 4, in certain embodiments, substitute pixels 46 are chosen such that the first group of pixels 40 and the second group of pixels 48 are near one another but do not overlap. A separation distance between the first group of pixels 40 and a second groups of pixels 48 may be, for example, zero pixels, 1 pixel, about 2 pixels, or about 5 pixels. As depicted, multiple substitute pixels 46 and second groups of pixels 48 may be selected in the vicinity of the sample pixel 42 and the first group of pixels 40, as required by the method 10.

Figure 5:
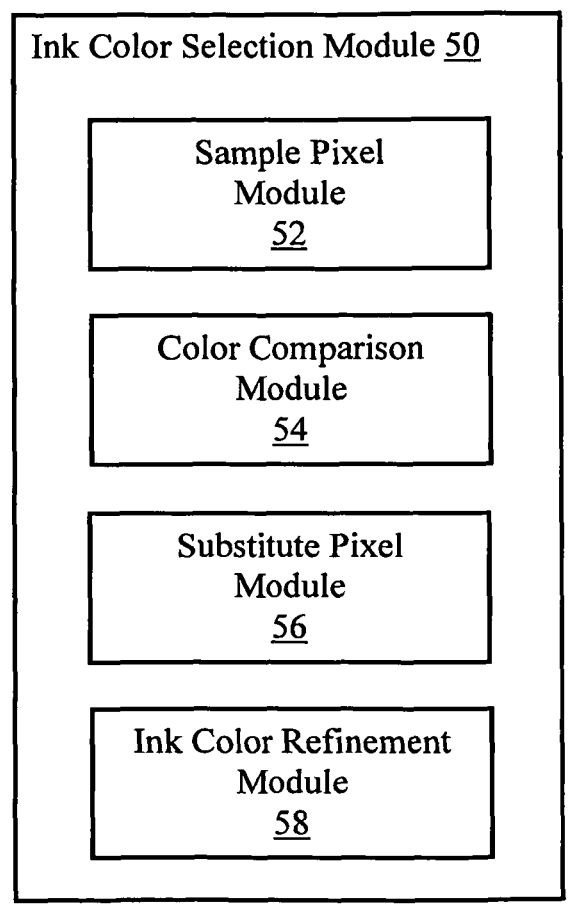
FIG. 5 is a schematic diagram of an example ink color selection module for selecting ink colors for a screen printing process.

Referring to FIG. 5, the method 10 is preferably implemented on a data processing device using an ink color selection module 50. The data processing device may be or include, for example, a workstation, a personal computer, a tablet computer, and/or a smart phone. The ink color selection module 50 includes a sample pixel module 52, a color comparison module 54, a substitute pixel module 56, and an ink color refinement module 58.

In general, the sample pixel module 52 selects or identifies locations for sample pixels within the image. The sample pixel module 52 may also identify neighboring pixels around each sample pixel. The sample pixels preferably define a subset of pixels in the image and are arranged in a grid. The sample pixels may have any spacing, however, which may be nonuniform or uniform, in a horizontal direction and/or a vertical direction in the image.

The color comparison module 54 compares the colors of one or more pixels in the image. For example, the color comparison module 54 may assess the similarity between two pixel colors or among the colors in a group of pixels. The color comparison module 54 may consider a color space, such as CIELAB, when comparing colors, and may calculate distances (e.g., CIEDE2000 distances) between one or more colors within the color space, as described herein.

The substitute pixel module 56 preferably selects or identifies locations for substitute pixels in the vicinity of a sample pixel. The substitute pixel module 56 may also identify neighboring pixels around each substitute pixel.

In various implementations, the ink color refinement module 58 is used to consolidate or reduce the number of chosen ink colors. For example, the ink color refinement module 58 may be used to identify chosen ink colors that are similar (e.g., within a threshold distance in a color space) and choose a single representative color as a replacement for the similar ink colors. For example, if the chosen ink colors from the method 10 include five similar green colors, the ink color refinement module 58 may pick a single green color to represent and replace the five green colors. The representative color may be, for example, one of the chosen similar ink colors, an average of the chosen similar ink colors, or a most prevalent of the chosen similar ink colors. In some embodiments, the chosen ink colors are grouped by similarities. For example, colors that are within a threshold distance (e.g., a CIEDE2000 distance of about 3, about 6, or about 9) in a color space (e.g., CIELAB) may be considered similar and placed in the same group. A single, representative color may then be selected from each group using a median cut. The ink color refinement module 58 may be used, for example, to reduce the number of chosen ink colors when the number of chosen ink colors exceeds the number of colors that may be used with the screen printing process. Alternatively or additionally, in some instances, the ink color refinement module may be used to consolidate or reduce the number of chosen ink colors.

In certain embodiments, the number of sample pixels and/or the spacing between the sample pixels in the digital image may be specified, according to user preferences and/or according to the type or content of the image. For example, images with more color variation or more colors may require a smaller sample pixel spacing. Large images may utilize a larger sample pixel spacing to reduce computation times.

Figure 6:
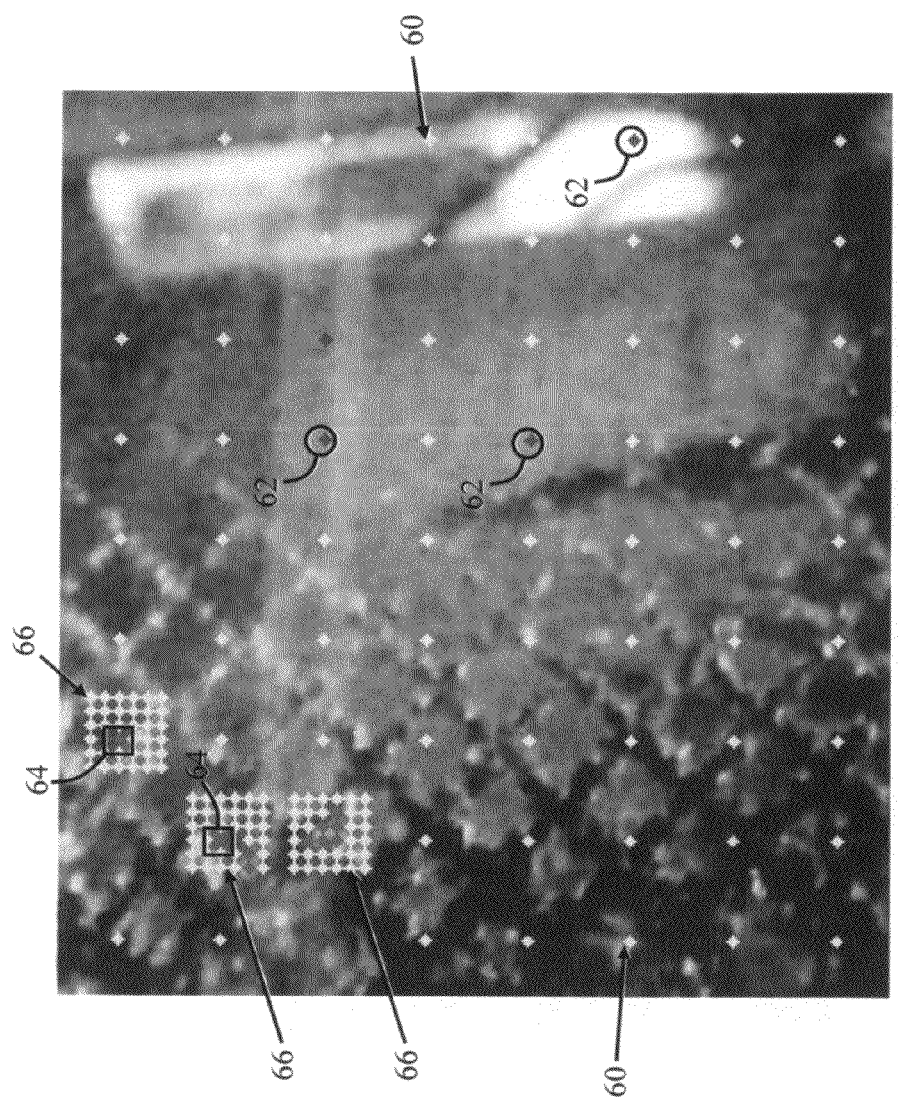
FIG. 6 is a portion of an example image that has been processed to select ink colors for a screen printing process.
Figure 7:
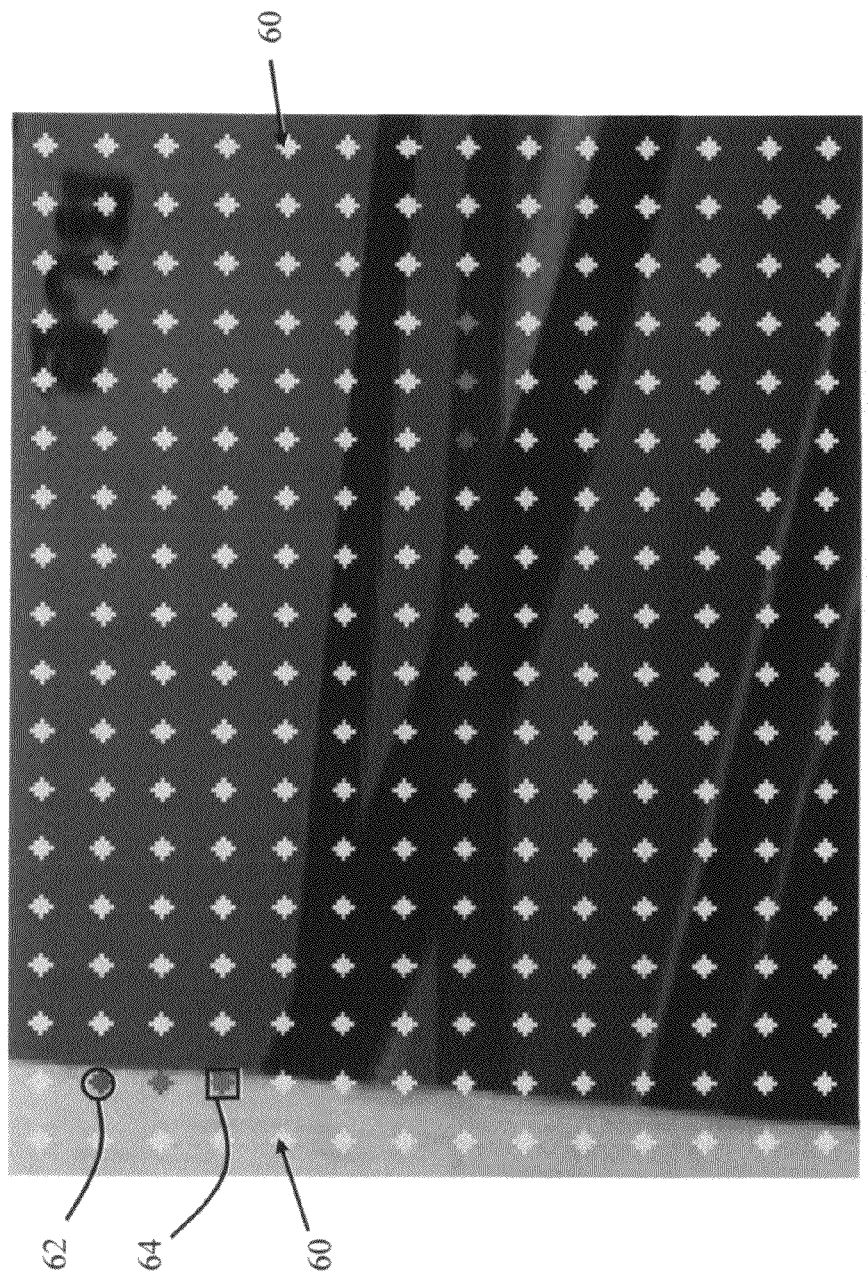
FIG. 7 is a portion of an example image that has been processed to select ink colors for a screen printing process.

FIGS. 6 and 7 are examples of images that have been processed using the systems and methods described herein. The images show locations 60 of sample pixels, each of which is surrounded by neighboring pixels to form a diamond-shaped first group of pixels. The sample pixels are uniformly spaced and arranged in a grid in each of these images. Given the relatively small number of ink colors used for the screen printing process (e.g., no more than 10 ink colors total), most of the sample pixels in these images do not correspond to a chosen ink color. Some sample pixels where ink colors were chosen are indicated with circles 62. Some sample pixels where color variation within the first group of pixels is excessive are identified with squares 64. In some regions 66 of FIG. 6, the systems and methods identified substitute pixels in the vicinity of a sample pixel.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of identifying ink colors for a screen printing process, the method comprising:
   obtaining an image to be reproduced with the screen printing process;
   selecting a set of sample pixels within the image; and
   for each sample pixel in the set:
     (a) determining a color of the sample pixel;
     (b) if the color of the sample pixel is similar to an already chosen ink color, proceeding to a next sample pixel in the set and returning to step (a), otherwise, advancing to step (c);
     (c) identifying colors of neighboring pixels around the sample pixel, the sample pixel and the neighboring pixels defining a first group of pixels;
     (d) if the colors of the first group of pixels are similar, choosing an ink color to be a representative color of the first group of pixels; and
     (e) proceeding to a next sample pixel in the set and returning to step (a).

2. The method of claim 1, wherein the image is a digital image comprising pixels.

3. The method of claim 1, wherein the sample pixels are arranged in a grid within the image and define a subset of pixels within the image.

4. The method of claim 1, wherein the color of the sample pixel is similar to the already chosen ink color when the color of the sample pixel and the already chosen ink color are within a threshold distance in a color space.

5. The method of claim 4, wherein the color space is selected from the group consisting of CIELAB, CIERGB, CIELUV, CIEUVW, and CIELCH.

6. The method of claim 1, wherein the first group of pixels defines a diamond-shaped pattern around the sample pixel.

7. The method of claim 1, wherein the colors of the first group of pixels are similar when the colors of the first group of pixels are within a threshold distance of one another in a color space.

8. The method of claim 1, wherein the representative color of the first group of pixels is the color of the sample pixel.

9. The method of claim 1, wherein choosing an ink color to be the representative color of the first group of pixels comprises using quantization.

10. The method of claim 1, further comprising, if the colors of the first group of pixels are not similar:
    selecting a substitute sample pixel in a vicinity of the sample pixel;
    determining a color of the substitute pixel;
    identifying colors of neighboring pixels around the substitute pixel, the substitute pixel and the neighboring pixels around the substitute pixel defining a second group of pixels; and
    if the colors of the second group of pixels are similar, choosing an ink color to be a representative color of the second group of pixels.

11. The method of claim 10, wherein the vicinity of the sample pixel is outside of the first group of pixels.

12. The method of claim 10, wherein the second group of pixels defines a diamond-shaped pattern.

13. The method of claim 10, wherein the colors of the second group of pixels are similar when the colors of the second group of pixels are within a threshold distance of one another in a color space.

14. The method of claim 10, wherein choosing an ink color comprises using quantization.

15. The method of claim 10, further comprising selecting a new substitute pixel in the vicinity of the sample pixel when the color of the substitute pixel and an already chosen ink color are within a threshold distance in a color space.

16. The method of claim 10, further comprising selecting a new substitute pixel in the vicinity of the sample pixel when the colors in the second group of pixels are not similar.

17. The method of claim 1, further comprising:
identifying a group of chosen ink colors that fall within a threshold distance in color space; and
choosing a representative ink color for the group of chosen ink colors.

18. A system comprising:
a non-transitory computer readable medium having instructions stored thereon; and
a data processing apparatus configured to execute the instructions to perform operations comprising:
obtaining an image to be reproduced with the screen printing process;
selecting a set of sample pixels within the image; and
for each sample pixel in the set:
(a) determining a color of the sample pixel;
(b) if the color of the sample pixel is similar to an already chosen ink color, proceeding to a next sample pixel in the set and returning to step (a), otherwise, advancing to step (c);
(c) identifying colors of neighboring pixels around the sample pixel, the sample pixel and the neighboring pixels defining a first group of pixels;
(d) if the colors of the first group of pixels are similar, choosing an ink color to be a representative color of the first group of pixels; and
(e) proceeding to a next sample pixel in the set and returning to step (a).

19. A computer program product stored in one or more non-transitory computer readable storage media for controlling a processing mode of a data processing apparatus, the computer program product being executable by the data processing apparatus to cause the data processing apparatus to perform operations comprising:
obtaining an image to be reproduced with the screen printing process;
selecting a set of sample pixels within the image; and
for each sample pixel in the set:
(a) determining a color of the sample pixel;
(b) if the color of the sample pixel is similar to an already chosen ink color, proceeding to a next sample pixel in the set and returning to step (a), otherwise, advancing to step (c);
(c) identifying colors of neighboring pixels around the sample pixel, the sample pixel and the neighboring pixels defining a first group of pixels;
(d) if the colors of the first group of pixels are similar, choosing an ink color to be a representative color of the first group of pixels; and
(e) proceeding to a next sample pixel in the set and returning to step (a).

* * * * *